Nov. 19, 1940.   D. R. McMULLEN ET AL   2,222,058
GASKET
Filed April 7, 1939
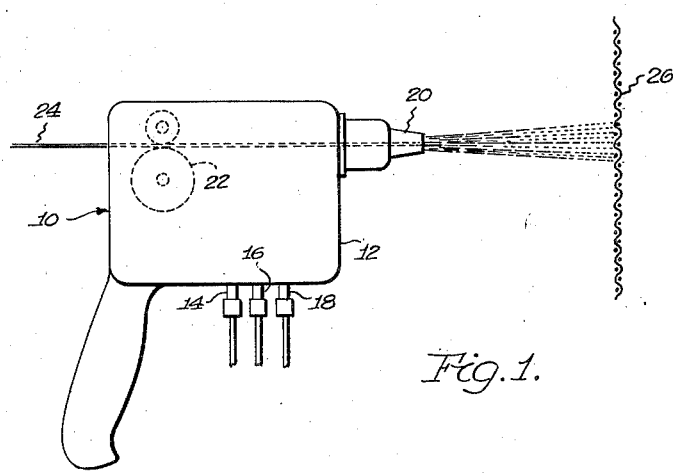
Fig.1.
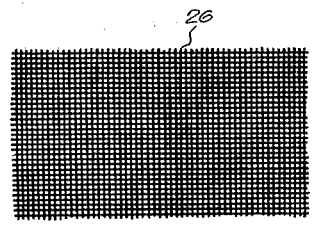
Fig.2.
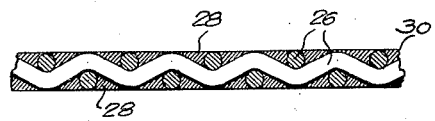
Fig.3.
Donald R. McMullen, Inventor
Charles Burt Walter,
By
 Attorneys Patented Nov. 19, 1940

2,222,058

UNITED STATES PATENT OFFICE 2,222,058

GASKET

Donald R. McMullen and Charles Burt Walter, Detroit, Mich.

Application April 7, 1939, Serial No. 266,590

2 Claims. (Cl. 288—30)

This invention relates, in general, to gaskets and, in particular, to a new and improved gasket for use at whatever temperature and pressure and with whatever fluid medium it is called upon to be used.

Heretofore, gaskets employed in high temperature and pressure work especially, no matter what the fluid medium has been, have lacked the necessary flexibility and resiliency to afford the greatest of efficiency. They have been expensive because of their weight and precision in making same. They have needed to be replaced by new ones upon each disassembly. They have had to be acceptable merely because there has been little advancement in the field utilizing same.

Therefore, the main object of this invention is to provide a new and improved gasket which is highly flexible and resilient yet impervious to fluids at whatever temperature or pressure it is subjected to.

Another object is to provide a new and improved gasket for use at high temperatures and/or pressures which is maximum in efficiency yet easy and inexpensive to manufacture.

Another object is to provide a new and improved gasket which is especially adapted for use and re-use where fluids particularly at high temperatures and pressures are employed and which is the product of the spraying of molten metal onto a section of open-work material, said material thereby having its interstices coated and/or filled with said molten metal and said pressure causing the blending or even coating of said metal over the surfaces of said material, the product or gasket becoming impervious yet retaining the resiliency and flexibility of said material.

Other objects and advantages of the invention will become readily apparent from a reference to the following specification taken in conjunction with the accompanying drawing in which:

Figure 1 is an elevational view illustrating the gasket in its manufacture;

Fig. 2 is a plan view of a section of base material from which the finished gasket is made; and Fig. 3 is a section through the finished gasket.

In Fig. 1 there is shown, somewhat diagrammatically and generally at 10, a blow torch of well known construction and design. Blow torch 10 comprises the usual casing 12 to which is attached the usual fittings 14, 16 and 18 connected to oxygen, acetylene and compressed air sources. Casing 12 is provided with the usual means (not shown) for inter-mixing the oxygen and acetylene and directing the mixture outwardly therefrom through the outlet nozzle 20 and for independently directing the compressed air outwardly through said nozzle. Means (not shown) are also provided within the casing 12 for communicating said compressed air with a device, such as an air turbine 22, for driving same, said turbine being in turn adapted for drawing a wire 24 of comparatively low melting point through casing 12 and outwardly therefrom through nozzle 20 into the vicinity of the expelled final mixture and compressed air. The lineal speed of travel of the wire 24 is such that the driven end of said wire remains substantially within the area where the ignited fuel mixture is the hottest. As the wire melts, the melted globules are atomized by the compressed air and impinged against the surface of a section of open-work material 26 which is supported in any suitable manner in and normal to the path of said air and in selected spaced relation to the nozzle 20.

The section 26, which forms the base for the finished gasket, is, as has been said, of open-work construction. It may be metallic or non-metallic, however woven, just so long as it is inherently flexible and resilient, or it may be any other material to which sprayed molten metal will adhere without destroying the original resiliency or flexibility thereof. The scope of the invention, with reference to the non-metallic materials for use as the base 26, includes fabrics, glass, paper and other such materials. The choice and characteristics of the material in the base 26 is purely selective though the selection is dependent upon the fluid medium and the pressure and thermal conditions under which the finished gasket is to be used. The gauge or mesh is also selective though within reasonable limits. For purposes of illustration only, section 26 is shown as being of metallic open-work construction.

The atomized globules of the metallic wire 24, upon being impinged against the exposed surface of the pervious base 26, fill and/or cover the interstices in said base and in general provide said surface with a substantially flat coating 28. After preferably both surfaces of the base 26 have been so exposed and worked, the finished gasket 30 is found to be impervious and of a uniform thickness not materially unlike that of the base 26. Also, the flexibility and resiliency of the gasket 30 are not unlike the flexibility and resiliency of its base 26. The gasket 30, if the proper metal in wire 24 and material in base 26 have been selected, is suitable for substantially any pressure, temperature, or fluid medium to which it might be subjected. It is adaptable for re-use. The base 26 supports the coatings 28, lending strength thereto and thereby rendering a gasket 30 which is impervious, strong and sturdy, yet flexible and resilient.

Although the foregoing description relates to a finished gasket which is substantially impervious throughout, the invention contemplates the formation of a gasket which is not totally impervious but which is impervious for at least the area of the contacting annulus between the gasket and the conduits or fluid lines to be sealed thereby. For instance, the gasket may be annular and it may be made impervious at and around its inner or outer marginal portions or at both portions or at various radii therebetween.

Although the invention has been described with some detail it is not intended that such description is to be definitive of the limits of the inventive idea. The right is reserved to make such changes in details as will come within the purview of the attached claims.

What we claim is:

1. As an article of manufacture, a gasket comprising, a base section of flexible, woven, metallic mesh material of predetermined thickness, and a filler section of metal positioned by spraying while in molten state substantially exclusively in the interstices between the elements of said material so as to possess flexibility and retain substantially the original thickness thereof.

2. As an article of manufacture, a gasket comprising, a base section of flexible, woven, mesh metallic material of predetermined thickness, and a filler section of metal positioned substantially exclusively in the interstices between the elements of said material by spraying both sides of the latter while in molten state so as to possess flexibility and retain substantially the original thickness of said material.

DONALD R. McMULLEN.
CHARLES BURT WALTER.